United States Patent [19]

Thompson et al.

[11] Patent Number: 4,968,460
[45] Date of Patent: Nov. 6, 1990

[54] CERAMICS

[75] Inventors: Ronald J. Thompson; Nur R. Gurak; Peter L. Josty; Valentino G. Xanthopoulo; James P. Russell, all of Sarnia, Canada

[73] Assignee: BASF Aktiengesellschaft, Fed. Rep. of Germany

[21] Appl. No.: 837,342

[22] Filed: Mar. 7, 1986

[51] Int. Cl.$^5$ .............................................. B29B 9/00
[52] U.S. Cl. ......................................... 264/6; 264/22; 264/25; 264/63
[58] Field of Search ......................... 264/63, 22, 25, 6

[56] References Cited

U.S. PATENT DOCUMENTS

| | | | |
|---|---|---|---|
| 3,472,803 | 10/1969 | Andrews et al. | 524/187 |
| 3,732,139 | 5/1973 | Rechillas | 156/291 |
| 3,875,270 | 4/1975 | Haefner et al. | 264/6 |
| 3,991,029 | 11/1976 | Adelman | 524/187 |
| 4,329,271 | 5/1982 | Kemr et al. | 524/386 |
| 4,474,919 | 10/1984 | Polatajko-Lobos et al. | 524/377 |
| 4,508,864 | 4/1985 | Lee | 524/187 |
| 4,629,593 | 12/1986 | Groh et al. | 264/63 |

FOREIGN PATENT DOCUMENTS 2138830 10/1984 United Kingdom .

OTHER PUBLICATIONS

Chemical Abstracts, vol. 102, 1985, No. 102:11330h.
Derwent Accession No. 85-192624/32, Ibiden Co. Ltd., 11/1983.

Primary Examiner—James Derrington
Attorney, Agent, or Firm—Bruce E. Harang

[57] ABSTRACT

Aqueous dispersions of binders may be used to make a slurry of a ceramic material. The slurry may then be shaped to a green part by conventional techniques such as tape casting. The slurry may be spray dried to give a free flowing powder which may be formed by dry pressing, roll compaction or other similar techniques. The tensile strength of the green part may be increased by subjecting the green part to an energy treatment such as heat or irradiation including ultraviolet (UV), X-rays and electron beams.

16 Claims, 5 Drawing Sheets

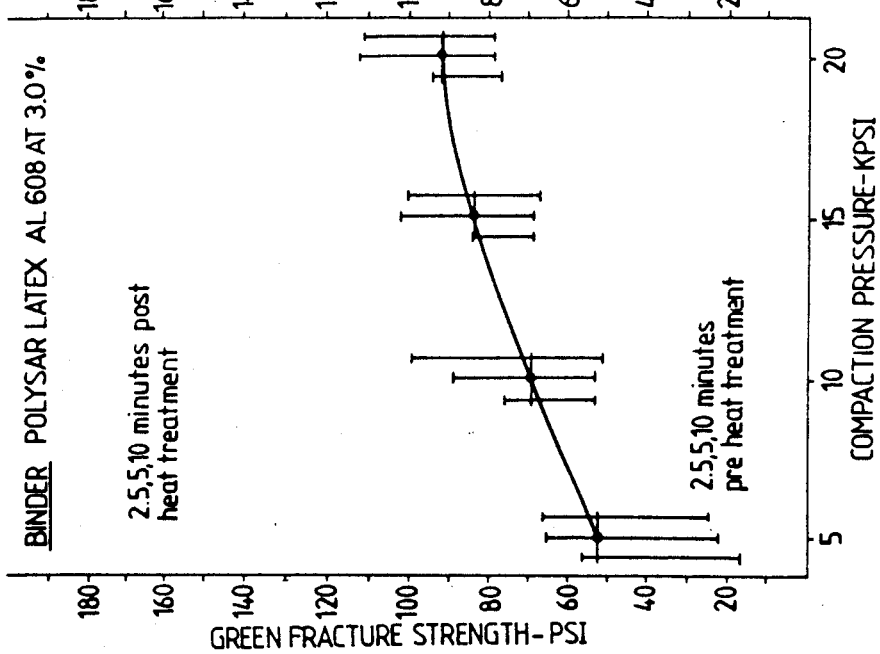
Fig. II.
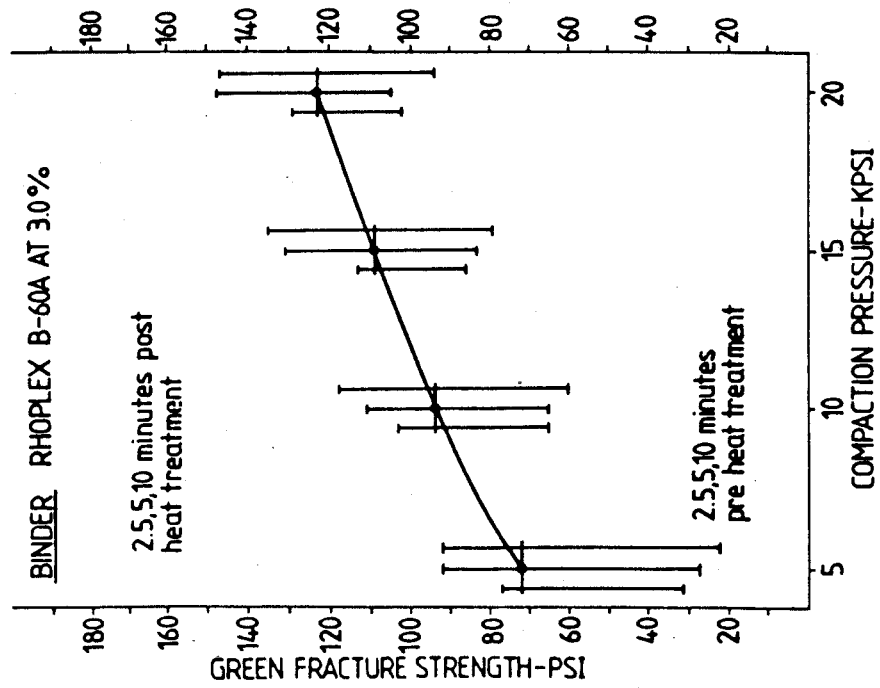
Fig. I.

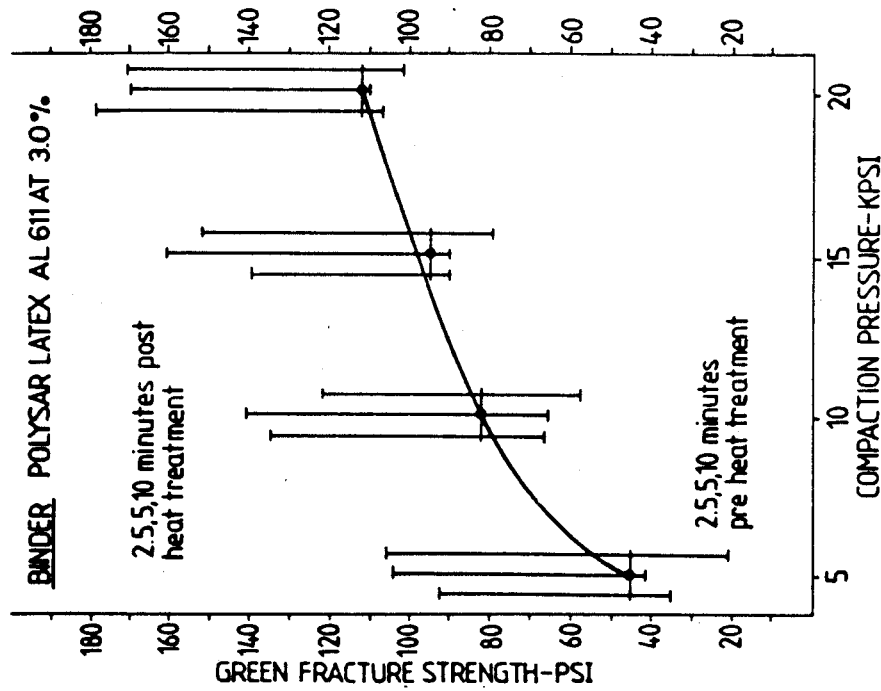
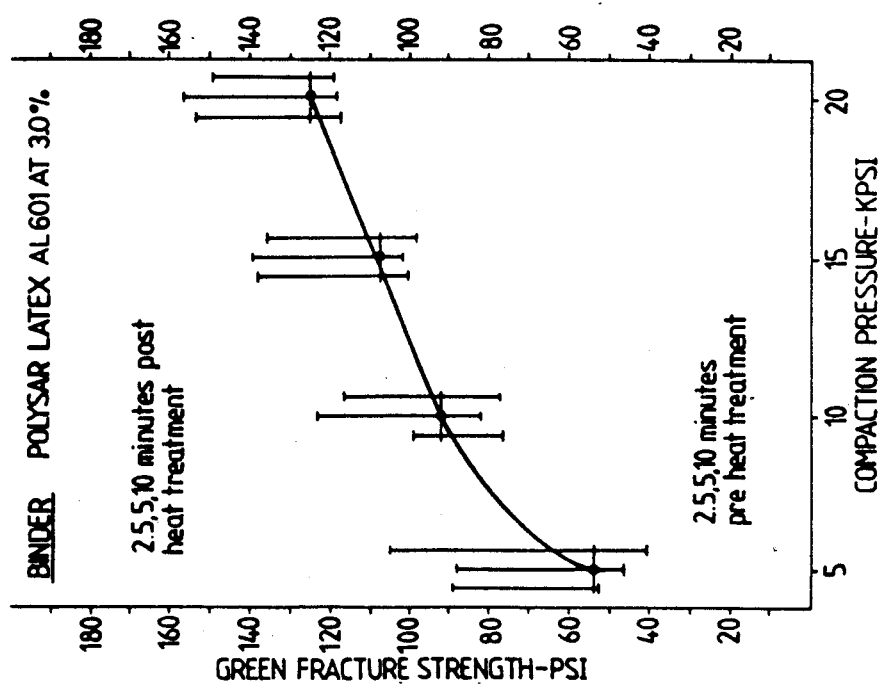

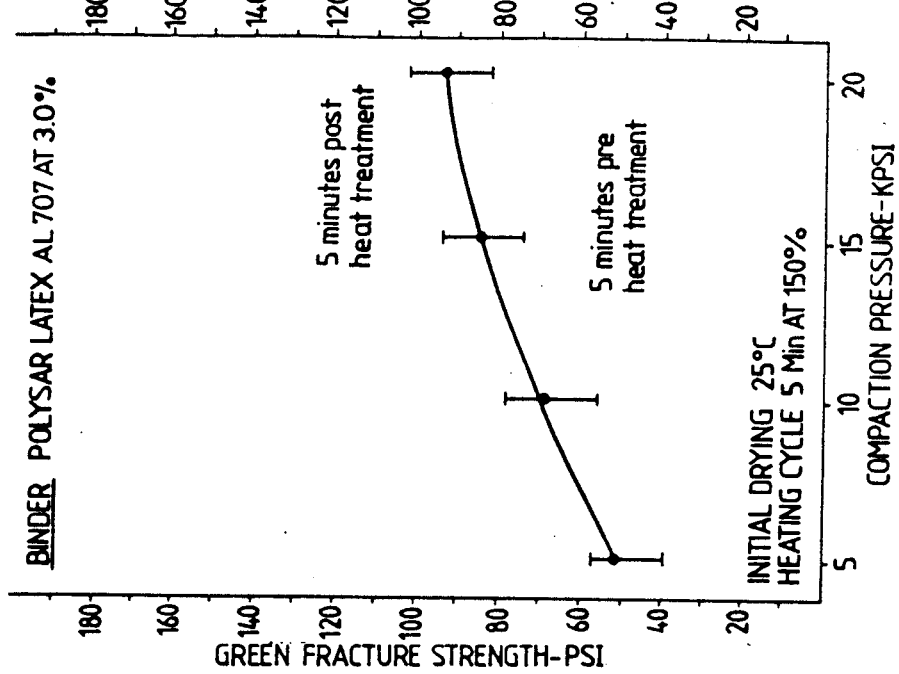
Fig. VI.
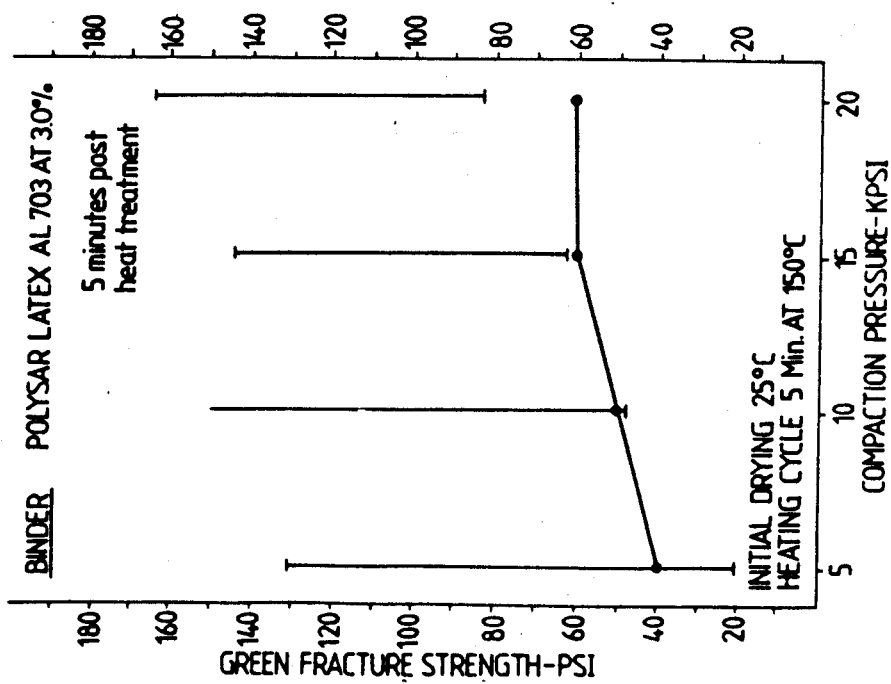
Fig. V.

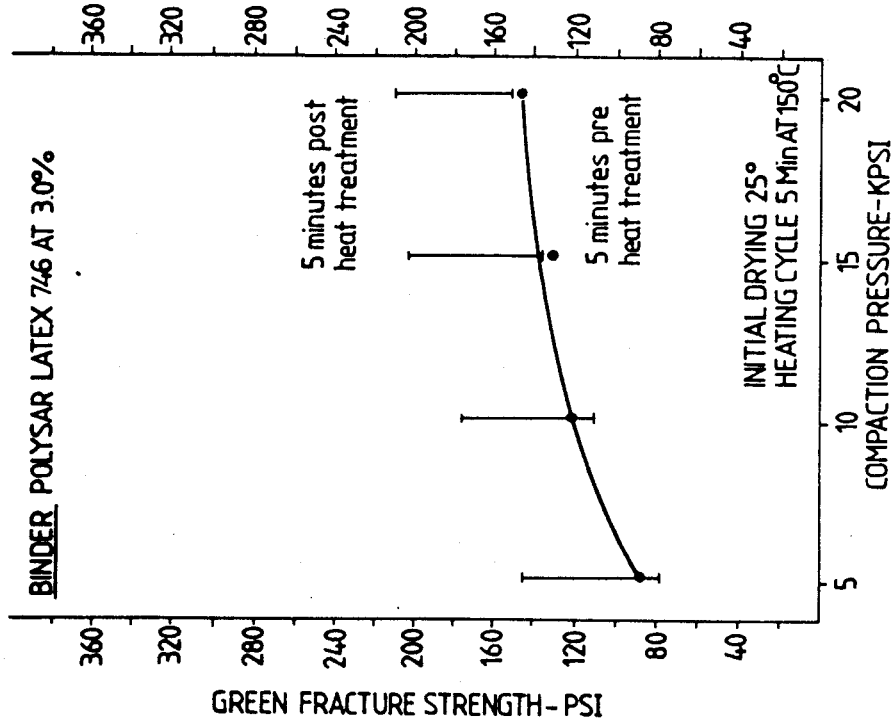
Fig. VIII
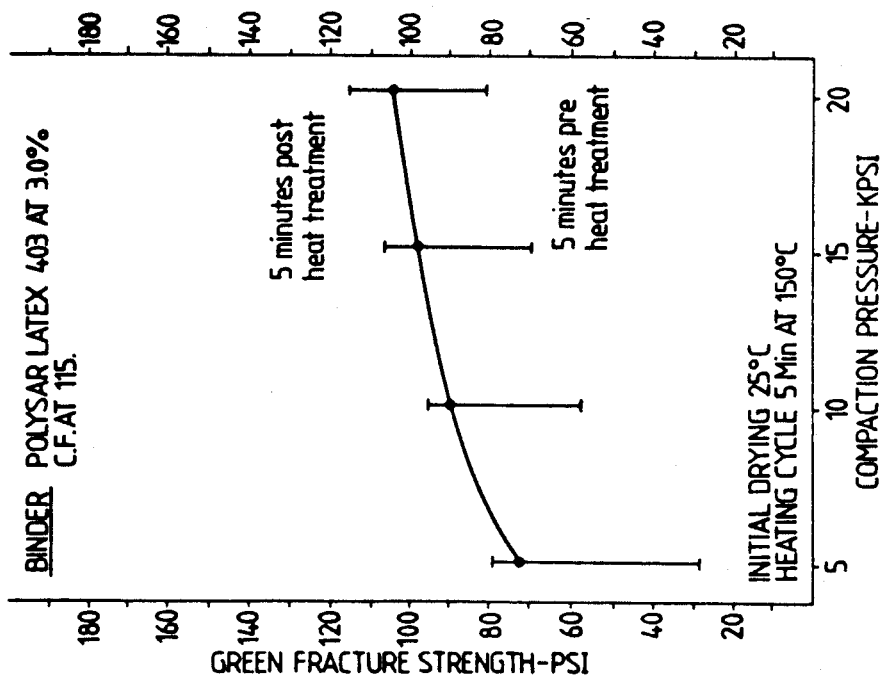
Fig. VII

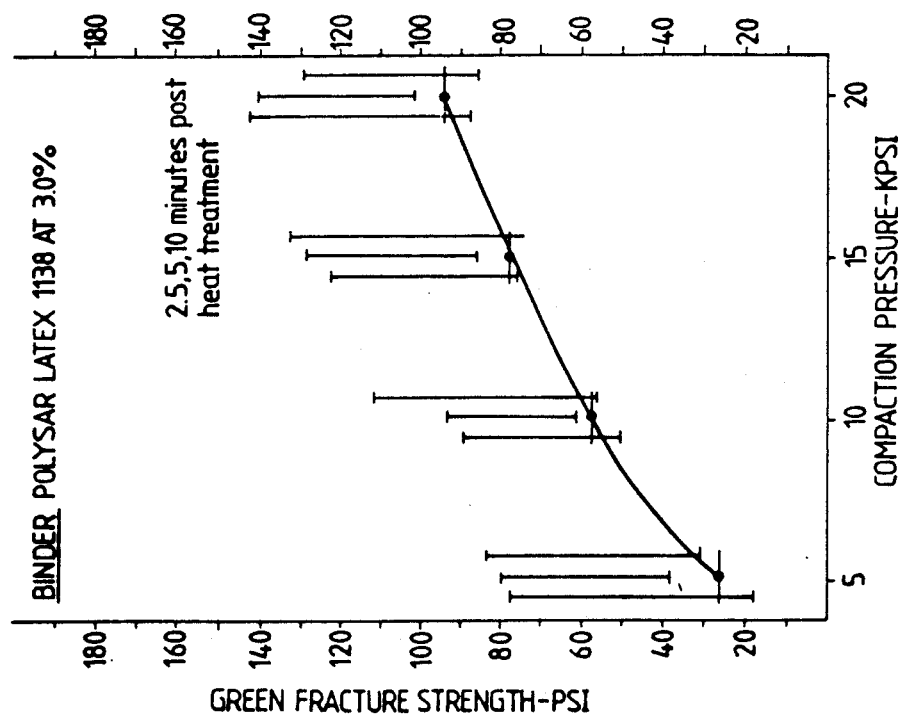
Fig. X.
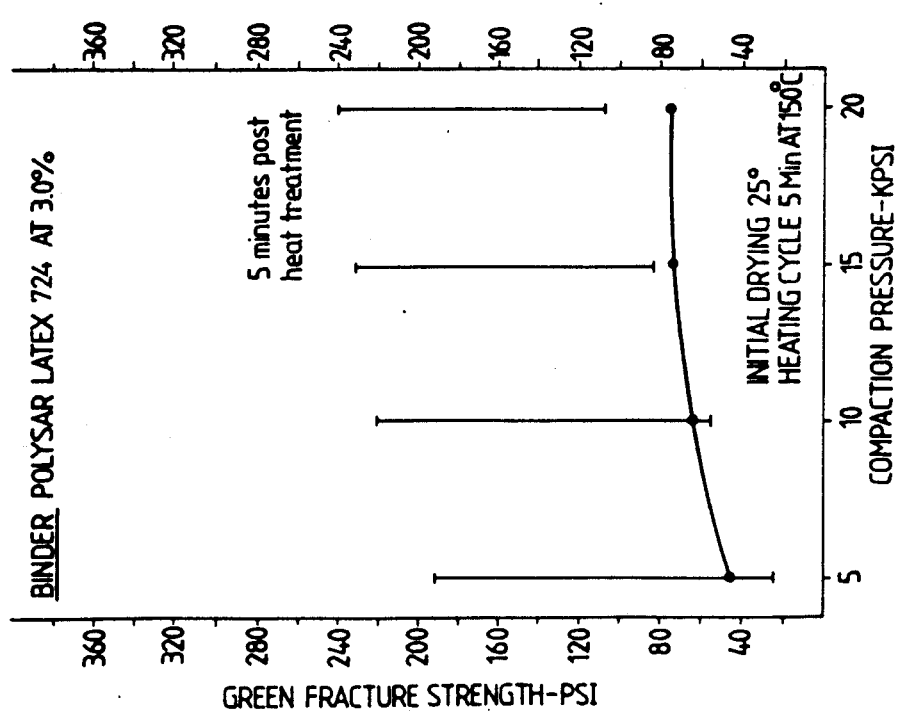
Fig. IX.

CERAMICS

BACKGROUND OF THE INVENTION

There are a number of fields of application for ceramics including traditional ceramics such as pottery and fine china; refractories; industrial ceramics such as abrasives and grinding wheels and technical ceramics. Technical ceramics are ceramics having a high purity. They are used in a number of applications including substrates for electrical circuits and mechanical parts.

There are several major processes currently used in manufacturing ceramics.

In several of these processes, a liquid based ceramic composition containing a binder is dried. The dried composition is then subjected to a compaction step such as dry pressing, roll compaction or injection molding.

In fluid compositions which are to be dried, the liquid phase has generally been water if a water soluble binder has been used or a volatile organic solvent for water insoluble binders. These organic solvents are relatively expensive; should not be released to the environment and may present a fire hazard. Polyvinylbutyral in a solvent is typical of such systems and is used in tape casting. Polyvinylalcohol has been used in aqueous based binder systems for dry pressing. Unfortunately, polyvinylalcohol is hygroscopic and spray dried ceramic particles coated with polyvinylalcohol tend to pick up moisture from the environment, thus reducing the free flowing nature of the ceramic powder.

U.S. Pat. No. 3,472,803 issued Oct. 14, 1969 assigned to Corning Glass Works discloses a ceramic composition for slip casting which comprises 70 to 83 percent of a ceramic material, 4 to 12 percent of a binder which is a copolymer of styrene and butadiene. Preferably the compound contains a sodium salt of a polyacrylic acid optionally in combination with triethanol amine.

U.S. Pat. No. 3,991,029 issued Nov. 9, 1976 assigned to E. I. DuPont de Nemours and Company discloses a ceramic compound for tape casting comprising an internally plasticized thermosetting resin. The polymers contain a self crosslinking monomer selected from the group consisting of glycidyl methacrylate and the n-methylol amides of acrylic or methacrylic acid.

Chemical Abstract 102:11330h of Japanese Kokai 59,121,152 [84,121,152] discloses the use of an aqueous based ceramic slip containing from 5 to 20 parts by weight of a copolymer of one or more of acrylic and methacrylic acid and one or more of $C_{1-18}$ mono or polyhydric alcohol esters of (meth)acrylic acid in a weight ratio of 50:50 to 99:1. The esters have a molecular weight of from 20,000 to 500,000 and are used in conjunction with an organic plasticizer, such as di-butyl phthalate.

U.S. Pat. No. 4,329,271 issued May 11, 1982 to GTE Products Corporation disclosed a process for tape casting using water soluble polymers. The present invention contemplates the use of polymer emulsions in water.

Derwent Accession No. 85-192624/32, an abstract of Japanese Kokai 60/118676 discloses a hot isostatic pressing of a uniform mixture of from 5 to 300 parts by volume of a thermoplastic material such as wax or polyethylene and 100 parts by volume of a ceramic. The soft binder permits the deformation of the ceramic mixture under a fluid pressure medium for the shaping of complex parts.

The references do not describe the use of an aqueous emulsion of a polymeric binder nor do they describe the type of treatment contemplated in the present invention.

SUMMARY OF THE INVENTION

The present invention seeks to provide a process for improving the green fracture strength of ceramic parts.

The present invention provides a process for increasing the green fracture strength of a ceramic part comprising:

(i) forming an aqueous based ceramic composition having at least 50 weight percent of solids comprising at least 65 weight percent of a mixture of from 100 to 85 weight percent of ceramic particles, and 0 to 15 weight percent of a flux material; a sufficient amount of an aqueous emulsion of a polymeric binder which has a Tg of from about $-100$ to about 120° C., to provide from about 0.5 to 35 weight percent of said binder and optionally up to 5 weight percent of a dispersing agent;

(ii) shaping and forming a green ceramic part from said slurry; and (iii) subjecting said green part to one or more energy treatments selected from the group consisting of electron beam irradiation, x-ray irradiation, ultraviolet irradiation, a heat treatment from about 50° to 200° C., or a combination of heat and pressure for a period of time sufficient to increase the green fracture strength of said green ceramic part.

While in its broadest aspect the present invention is applicable to liquid casting methods such as tape casting or slip molding it is preferred to use the process of the present invention in conjunction with a compaction process such as dry pressing or roll compacting. In accordance with the present invention it is preferable to carry out the process of the present invention wherein said step of shaping and forming said green ceramic parts comprises spray drying said aqueous based ceramic composition to produce a free flowing particulate ceramic material; and subjecting said particulate ceramic material to a compaction step at a pressure of from 2500 to about 30,000 psi to a density of at least 50 percent theoretical density and said energy treatment comprises a heat treatment at from about 50° to 200° C.

In tape casting the liquid ceramic composition is cast as a thin tape. Depending on the application this may be from 30 microns to 0.1 inches, preferably from about 1 mil to about 20 mils. Since the films are thin the treatment may be carried out by irradiation such as electron beam, x-ray or ultraviolet light. The utility of ultraviolet irradiation will depend on the ability of the light to pass through the film and the reactivity of the polymeric binder under ultraviolet light. Where ultraviolet irradiation will not pass through the green part, and a short process time is desired the treatment may be selected from electron beam or x-ray irradiation.

DETAILED DESCRIPTION

The ceramic materials useful in the present invention include those known in the industry and not susceptible to derogatory chemical reaction, under the process conditions of this invention. Such ceramics include non reactive oxides, nitrides and carbides. Examples of such ceramics include alumina, silicon carbide, silicon nitride, zirconia, silica, barium titanate; and mixtures thereof. Silicates include the glass silicates and aluminum silicates. Preferably the ceramic material has a small particle size in the range from 0.5 to 12 microns. Depending on the end use of the ceramic up to about 10 percent preferably about 0.001 to 5 percent, preferably 0.05 to 1 percent, of the ceramic may be replaced with a flux material or another ceramic such as borides or oxides of lead, iron or tin, or another ceramic such as magnesium oxide.

In preparing the fluid ceramic composition the ceramic may be wet or dry milled for a period of time sufficient to break up and separate agglomerated material but not further reduce particle size. The length of the milling will depend upon the time it takes to get to the desired particle size. Suitable times for wet milling are up to about 24 hours, preferably from about 4 to 18 hours. Wet milling provides a uniform dispersion. In some cases excessive milling may be detrimental to the final ceramic composition. The ceramic is dispersed in water in an amount to provide a ceramic content of not less than 50 weight percent in the final composition. Generally about 75 to 85 parts by weight of ceramic are dispersed in from about 25 to 15 parts by weight of water. If the ceramic is dry milled an aqueous dispersion of the ceramic is formulated to give the solids content described above. A dispersing agent may be added to the ceramic/water slurry to prevent a reagglomeration of ceramic particles and to form a uniform dispersion. The type and level of dispersing agent should be selected so as not to have a negative impact on the process. Anionic or non ionic dispersing agents may be used with anionic aqueous emulsions of polymeric binder. Similarly nonionic or cationic dispersing agents may be used with cationic aqueous emulsions of polymeric binder. Amphoteric surfactants may be used with both anionic and cationic emulsions. Many useful dispersing agents are listed in McCutcheons' Functional Materials published annually by McCutcheon Division of MC Publishing Co. A particularly useful class of dispersing agents are the poly electrolytes such as Darvan 7 (Trademark of R. T. Vanderbilt Co.). In the preparation of ceramics for use in electronic applications it is believed to be desirable to use a dispersing agent which does not contain high amounts of metallic ions; such dispersing agents include styrene maleic anhydride; Daxad 32 an ammonium salt of a carboxylated polyelectrolyte (Trademark of W. R. Grace and Co.) and Darvan C (a trademark of R. T. Vanderbilt Co.). If present, the dispersing agent is preferably used in the minimum amount to be effective. Generally the dispersant may be used in amounts up to about 5 weight percent based on the total weight of the final ceramic compound. Preferably the dispersant is used in amounts of less than about 2 weight percent based on the final ceramic composition.

After the formation of the ceramic and water dispersion the aqueous emulsions of the polymeric binder is added to it. Preferably the binder is added as a medium solids emulsion containing from about 30 to about 60 percent polymer. The binder is added in an amount so that the solids level of the resulting composition is not less than about 50 percent, preferably in the range 65 to 85 percent.

The binders of the present invention are added in the form of an emulsion in water. In selecting a binder the isoelectric point and the surface charge of the ceramic material should be considered. The aqueous emulsion of polymeric binder should not coagulate to any appreciable extent under the conditions of use. In some cases it may be necessary to buffer the ceramic slurry. If a buffer is necessary care should be taken to avoid agents which will contribute undesirable ions to the ceramic slurry.

The binder is generally present in the ceramic compound in an amount not greater than about 50, preferably less than about 35, percent by weight calculated as dry parts of polymer on dry parts of ceramic material.

In dry pressing the binder is usually present in an amount of less than about 6 weight percent of the dried ceramic composition, preferably from about 1 to about 3 weight percent. For other applications such as injection molding or roll compaction, the binder content may be as high as about 50 weight percent, typically 25 to 40, preferably less than 35, weight percent, for injection molding and isostatic pressing and 5 to 15 weight percent for roll compaction.

Preferably the polymers of the present invention are polymers which are film forming at or below about 40° C., preferably below room temperature. The polymers should be capable of deformation under pressure and capable of crosslinking or reacting with a crosslinking agent if present upon further energy inputting treatment such as heating, electron beam, ultraviolet light, x-ray, irradiation, etc.

Polymers useful in accordance with the present invention may be generally characterized as polymers of esters including acrylates, SBR type polymers, ethylene vinyl acetates, NBR's, conjugated diolefins and copolymers or homopolymers of vinyl chloride and vinylidene chloride copolymers of ethylene and vinylidene chloride, copolymers of ethylene and vinyl chloride and homopolymers of vinyl aromatics polymers. The polymers are used in the form of an aqueous emulsion containing up to about 70 percent by weight of polymer. Commercially available emulsions of polymers in water generally have a polymeric content from about 45 to 60 percent. The polymers may have a Tg from −100 to about +120, preferably from about −20° to +40° C. For polymers with a relatively high Tg it may be necessary to include a conventional external plasticizer.

Suitable esters are polymers comprising:

at least about 50, preferably at least 90, weight percent of one or more $C_{1-6}$ alkyl or hydroxy alkyl esters of a $C_{3-6}$ ethylenically unsaturated monocarboxylic acid or a half ester of a $C_{3-6}$ ethylenically unsaturated dicarboxylic acid;

up to 45 weight percent of one or more monomers selected from the group consisting of $C_{8-12}$ vinyl aromatic monomers which may be unsubstituted or substituted by a $C_{1-4}$ alkyl radical; $C_{3-6}$ alkenyl nitriles and $C_{3-8}$ alkenyl or hydroxy alkenyl esters of a $C_{1-8}$ saturated carboxylic acid; and optionally up to a total of 20 preferably less than 10 weight percent of one or more monomers selected from the group consisting of $C_{3-6}$ ethylenically unsaturated carboxylic acids; $C_{3-6}$ ethylenically unsaturated aldehydes; and amides to $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals.

The amount of ethylenically unsaturated acid should be chosen to give the required rheology properties in the ceramic dispersion. At high pH's highly carboxylated latices tend to swell and are subject to an upward drift in viscosity. A method for controlling this type of viscosity drift by incorporating from about 0.1 to 10 percent by weight based in the weight of the polymer of a low molecular weight (100 to 5000) $C_{2-4}$ alkylene glycol is disclosed in U.S. Pat. No. 4,474,919 issued Oct. 2, 1985 to Polysar Limited, the text of which is hereby incorporated by reference.

Preferred $C_{3-6}$ ethylenically unsaturated acids are acrylic acid, methacrylic acid and itaconic acid.

Suitable esters of acrylic and methacrylic acid include methyl acrylate, ethyl acrylate, propyl acrylate, butyl acrylate, pentyl acrylate, hexyl acrylate, hydroxyethyl acrylate, methyl methacrylate, ethyl methacrylate, propyl methacrylate, butyl methacrylate, pentyl methacrylate, hexyl methacrylate, hydroxyethyl methacrylate, and other hydroxy alkyl homologues of the foregoing esters. Homologues of other $C_{3-6}$ ethylenically unsaturated non carboxylic acids or half esters of dicarboxylic acids are also useful.

Suitable amides include acrylamide, methacrylamide, N-methylol acrylamide. N-methylol methacrylamide. Preferably the polymer contains from about 0.5 to 2.5 weight percent of these amides if they are present.

Suitable vinyl aromatic polymers include styrene, and alpha methyl styrene.

Preferably the ester polymers have a Tg from about $-30°$ to $+30°$ C. most preferably from about $-10°$ to about $25°$ C.

Suitable alkenyl and hydroxy alkenyl esters of $C_{1-8}$ saturated carboxylic acids include the vinyl esters such as vinyl acetate. These esters may also be referred to as esters of non addition polymerizable carboxylic acids.

A particular useful class of acrylate polymers comprises:

from about 95 to 50, preferably 60 to 80, weight percent of one or more $C_{1-8}$ alkyl or hydroxyl alkyl esters of acrylic or methacrylic acid;

from about 1 to 45 preferably 5 to 40 weight percent of a monomer selected from the group consisting of $C_{8-12}$ vinyl aromatic monomers which may be unsubstituted or substituted by a $C_{1-4}$ alkyl radical and a $C_{3-6}$ alkenyl nitrile;

from about 0.5 to 5 weight percent of one or more $C_{3-6}$ ethylenically unsaturated carboxylic acids;

and optionally up to 10, preferably about 5, weight percent of one or more amides of a $C_{3-6}$ ethylenically unsaturated carboxylic acid, which amide may be unsubstituted or substituted at the carbon atom by up to two radicals selected from the group consisting of $C_{1-4}$ alkyl radicals and $C_{1-4}$ hydroxy alkyl radicals.

Useful esters of acrylic and methacrylic have been listed above under the description of acrylic polymers.

Vinyl aromatics are preferred monomers in this polymers group. The vinyl aromatic monomers have been discussed above.

Suitable alkenyl nitriles include acrylonitrile, methacrylonitrile and nitriles of higher ethylenically unsaturated carboxylic acids.

Suitable ethylenically unsaturated carboxylic acids include acrylic acid, methacrylic acid, fumanic acid and itaconic acid. Preferably the acids are present in an amount from about 0.5 to about 3 weight percent of the binder.

If present the amide of $C_{3-6}$ ethylenically unsaturated carboxylic acids is preferably in an amount from about 0.5 to 3 weight percent of the binder. Suitable amides have been discussed above.

Preferably the acrylate polymers have a Tg from about $-20°$ to $35°$ C.

The polymers of the SBR type have a Tg from about $-55°$ to about $60°$ C., preferably from about $-50°$ to $40°$ C. The polymers comprise from about 20 to 60, preferably 20 to about 40 weight percent of a $C_{8-12}$ vinyl aromatic monomer which may be unsubstituted or substituted by a $C_{1-4}$ alkyl radical; from about 80 to 40, preferably from 80 to 60 weight percent of one or more $C_{4-6}$ conjugated diolefin which may be unsubstituted or substituted by a chlorine atom; and optionally from about 0.5 to 10 preferably from about 1.5 to 5 weight percent of one or more $C_{3-6}$ ethylenically unsaturated carboxylic acids; and optional up to 5 preferably from 0.5 to 3 weight Percent of the polymer of an amide of a $C_{3-6}$ ethylenically unsaturated carboxylic acid which amide may be unsubstituted or substituted at the nitrogen atom by up to two radicals selected from the group consisting of $C_{1-4}$ alkyl radicals and $C_{1-4}$ hydroxy alkyl radicals.

Suitable vinyl aromatic monomers have been discussed above. Suitable $C_{4-6}$ conjugated diolefins include butadiene and isoprene. Suitable $C_{3-6}$ unsaturated carboxylic acids and amide derivatives thereof have been discussed above.

The polymer may be a co- or ter-polymer of an alpha olefin and a vinyl ester type monomer or vinyl chloride or vinylidene chloride. Preferably the polymer comprises:

from 1 to 25 preferably from 5 to 20 weight percent of one or more $C_{2-3}$ alpha olefins;

from 65 to 99 preferably from 60 to 80 weight percent of one or more monomers selected from the group consisting of a $C_{3-6}$ ethylenically unsaturated ester of a $C_{1-6}$ non addition polymerizable carboxylic acid, vinyl chloride and vinylidene chloride;

and optionally up to a total of 10 weight percent of one or more monomers selected from the group consisting of $C_{3-6}$ ethylenically unsatuated carboxylic acids; and $C_{1-4}$ alkyl or hydroxy alkyl esters of $C_{3-6}$ ethylenically unsaturated carboxylic acids; amides of a $C_{3-6}$ ethylenically unsaturated carboxylic acid which amide may be unsubstituted or substituted at the nitrogen atom by up to two radicals selected from the group consisting of $C_{1-4}$ alkyl radical and $C_{1-4}$ hydroxy alkyl radicals; and $C_{3-6}$ ethylenically unsaturated aldehydes. If present, the acid is used in an amount from about 0.5 to 5 weight percent of the polymer. If the amide is present it is also preferred to be used in an amount from 0.5 to 5 weight percent of the polymer.

Preferably the polymer will have a Tg from about $-20°$ to $40°$ C. preferably from about $-20°$ to about $25°$ C.

Suitable ethylenically unsaturated carboxylic acids and amides thereof have been discussed above. Suitable olefins are ethylene and propylene. Suitable unsaturated esters of non addition polymerizable saturated acids include vinyl acetate, vinyl propionate and vinyl formate.

The polymer may be a nitrile rubber polymer. The polymer may comprise:

from about 15 to 50, preferably from about 20 to 40 weight percent of a $C_{3-6}$ alkenyl nitrile;

from about 85 to 50 weight percent of one or more monomers selected from the group consisting of:

$C_{8-12}$ vinyl aromatic monomers which may be unsubstituted or substituted by a $C_{1-4}$ alkyl radical;

$C_{4-6}$ conjugated diolefins; and $C_{1-4}$ alkyl or hydroxy alkyl ester of $C_{3-6}$ ethylenically unsaturated carboyxlic acids; and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals.

Preferably the polymer comprises about 20 to 40 weight percent of an alkenyl nitrile from about 80 to 60 weight percent of a $C_{4-6}$ conjugated diolefin and optionally up to 10 percent of styrene or a carboxylic acid monomer. Suitable monomers have been described above. Generally, the nitriles have a Tg from about −50° to about +40° C. Preferably the polymers have a Tg from about −20° C. to about +40° C.

Suitable polymers may be homopolymers or copolymers of vinyl chloride or vinylidene chloride. Homopolymers of vinyl chloride are useful. It is also possible to use a copolymer of vinyl chloride and a $C_{3-6}$ alky or hydroxy alkyl ester of a $C_{3-6}$ ethylenically unsaturated carboxylic acid in a weight ratio from about 25:75 to about 75:25 and optionally up to a total of 10 weight percent of one or more monomers selected from the group consisting of $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxyalkyl radicals.

The homopolymers and copolymers predominantly of the vinyl aromatic monomers are also suitable in the present invention. Suitable polymers comprise at least about 80 percent of a $C_{8-12}$ vinyl aromatic monomer which may be unsubstituted or substituted by a $C_{1-4}$ alkyl radical; and optionally up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl or hydroxy alkyl esters of $C_{3-6}$ ethylenically unsaturated carboxylic acids; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals. Suitable monomers have been identified above.

As used in this specification the term polymeric binder is intended to include polymer systems which may contain an external plasticizer. Most of the polymers of the present invention are soft enough not to require the presence of a plasticizer. Some of the higher Tg acrylates, PVC's, and homopolymers of aromatic monomers may require plasticizers. Useful plasticizers include esters such as dioctyl phthalate and the aromatic phosphates.

It is known that the molecular weight distribution of the polymer will affect its adhesive properties. The binder may be as disclosed in U.S. Pat. No. 4,508,864 issued Apr. 2, 1985 to Polysar Limited, the disclosure of which is hereby incorporated by reference, with a molecular weight distribution so that from about 20 to about 55 percent of the binder has a molecular weight greater than about 320,000. The methods for controlling the molecular weight of a polymer are well known in the art and do not form part of the teaching of the present application. One suitable method for controlling the molecular weight distribution of acrylate polymers is discussed in U.S. Pat. No. 3,732,139 issued May 8, 1973 to Johnson and Johnson.

From packing theory, it is known that the particle size distribution of polymer particles in a latex will affect the solids content and rheology of the latex and compounds based on the latex. The particle size distribution of the polymer also effects the adhesion and binding power of the polymer. The particle size of the polymer in the latex should be selected on the basis of the particle size of the ceramic material and the required rheology of the ceramic slurry. One useful particle size distribution in high solids compositions is such that from about 65 to 85 weight percent of the polymer particles have a size from 1700 to 3000 Å, preferably from 1200 to 1800 Å, and from about 35 to 25 weight percent of the polymer particles have a particle size from 300 to 1000 Å, preferably from 450 to 650Å. A process for obtaining such a particle size distribution is disclosed in British Patent Specification No. 2,138,830 in the name of Polysar Limited, the disclosure of which is hereby incorporated by reference.

Depending on the green fracture strength required, the fluid ceramic composition of the present invention may include a crosslinking agent. There are many types of these agents available including sulphur and sulphur containing organic compounds such as carbamyls carbamates and sulfenamides; metal oxides such as zinc oxide or lead oxide; diamines or polyamines such as alkylene diamines including ethylene diamine or hexamethylene diamine, epoxides or polyhydric alcohols such as 1,2,3,4 diepoxide butane, and 3,4 epoxy-6-methyl cyclohexyl methyl 3-4 epoxy-6-methyl cyclohexane carboxylate; diisocyanates such as p-phenylene diisocyane. These functional groups may be combined in one crosslinking agent such as a diamine and a sulphur containing compounds. In selecting a crosslinking agent care must be taken to ensure that the treatments applied to the ceramic composition prior to the formation of the green part will not result in significant crosslinking which will have a negative effect on the adhesion and binding characteristics of the polymer.

While metal compounds are inappropriate in circumstances where the purity of the ceramic is important, in other cases metal ions such as zinc oxide or magnesium oxide may serve a dual purpose of doping the ceramic and crosslinking the binder.

For liquid forming processes the ceramic slurry is formed by casting or in a mold and dried under conditions so that the vapour pressure of water in the slurry does not exceed the total pressure of the ambient environment, preferably from room temperature up to about 100° C. at atmospheric pressure. The green part is then subjected to a treatment in accordance with the present invention, and then subjected to conventional firing.

For dry forming processes the ceramic composition may be dried and granulated or preferably this is done by spray drying. These procedures are well known in the art. Typical air inlet temperatures in spray dryers are in the range 100° to 200° C. preferably 150° C. Air exit temperatures are lower in the range 80° to 100° C. respectively. The residence time in the spray drying is short in the order of seconds, preferably less than about 10 seconds, most preferably less than about 5 seconds. Alternately, the ceramic slurry may be dried by a conventional means and then granulated. The granular ceramic material should be sieved to a uniform small particle size.

The free flowing dried ceramic composition is then subject to compaction and final treatment.

In press molding the granular material is placed in the mold and compacted at pressures from 2500 to about 30,000 psi preferably from about 5 to about 25,000 psi. In roll compaction the granular ceramic passes through compaction rolls. In the process of the prior art the green part was stored and then fired at a convenient later date.

In the process of the present invention the green ceramic part is subject to an energy treatment which will improve the green fracture strength of the part. The total energy input into the entire process must be considered in relation to the mass of polymer and its Tg, and the efficiency of the energy input in the last step of the process.

Without wishing to be bound by theory it is believed the improvement in green fracture strength may be a result of the total energy input of spray drying; compaction and/or the additional step such as heat, electron beam or x-ray radiation, ultraviolet light. The total energy input should be controlled so that only after formation of the green part is the green fracture strength of the part maximized.

The green part may be subjected to a heat treatment. The heat treatment should be sufficient to increase the green fracture strength of the part. This will depend on the time and temperature of the heat treatment. Suitable heat treatments are at temperatures from about 50° to 200° C., preferably from 100° to 150° C. For relatively small parts, the heat treatment is carried out for less than about 30 minutes. The higher the temperature the shorter the heat treatment. With large masses of ceramic material a longer heat treatment may be required. The effectiveness of the heat treatment may be tested by measuring the fracture strength of the green ceramic part before and after heat treatment.

For irradiation the dosage and type of irradiation will depend on the amount of polymer and the mass of the ceramic. Preferred irradiation techniques include electron beam, and x-ray irradiation. In thin films ultraviolet light may be sufficient to achieve the required green fracture strength. In some cases the ultra violet light will not quickly cause an increase in green fracture strength. In such cases the ceramic composition may include small amounts of catalysts which are activated under UV light such as the benzoin ether. These compounds include benzoin allyl ether and benzoin $C_{3-5}$ alkyl ethers.

In the formation of the green part the green density of the ceramic material should be at least 50 percent, preferably at least 55 percent of the theoretical density of the ceramic. It should be noted that it is desirable to achieve a green density as high as possible in the ceramic part as a density variation of 1 or 2 percent in the green part may cause a variation in the density and/or the uniformity of the sintered product. Without being bound by theory it is believed that the Tg of the polymer is significant. Higher Tg polymers give higher green strength but are more difficult to deform in the mold.

The free flowing granular powder may also be subject to an injection molding process. The powder and ceramic mixture may be extruded through an extruder into a mold. In the injection molding process the ceramic is molded and may be subject to a heat treatment concurrently. Hot isostatic pressing may also be used to form a green part from the free flowing granular powder. In roll compaction and dry pressing the compaction is generally at relatively low temperatures, usually less than about 50° C. preferably about room temperature. As noted above, the compaction step and the heat treatment may be carried out concurrently.

The heat treatment is generally carried out at temperatures from about 50° to about 200° C. The heat treatment will depend upon the size of the ceramic part being treated. With relatively small parts, the heat treatment is generally from about 3 to 20 minutes. With larger parts, the heat treatment may be longer. Care must be taken not to subject the green part to an excessive heat treatment. Prolonged heating or heating to too high a temperature or prolonged irradiation may cause polymer degradation and a loss of green strength. This loss of strength can, to a reasonable extent, be guarded against by incorporating an antioxidant into the fluid ceramic composition. Care should be taken in the amount and type of antioxidant used, if any, as this may increase the heat treatment required to "burn out" the binder and/or interfere with the improvements in green fracture strength. It is best to test the ceramic compositions by spray drying them then pressing pellets from the powder and subjecting them to various heat or irradiation treatments to determine optimum composition and process conditions to be used.

The resulting green part is then fired. Firing will affect the final density of the ceramic. Generally firing for a longer time or at higher temperatures tends to produce a ceramic with a final density closer to theoretical density. Firing conditions will vary depending on the ceramic. For alumina typical firing conditions are from 1300° to 1550° C. for from about 2 to 5 hours, preferably about 2 to 3 hours.

The following examples are intended to illustrate the invention and not to limit it. In the examples unless otherwise indicated the parts are parts by weight.

A master batch slurry was prepared using Reynolds calcined alumina RC-HP DBM alumina (trademark) containing 0.050 wt. percent of magnesium oxide as a fluxing aid.

The slurry composition comprised:

|  | Dry | Wet |
|---|---|---|
| Alumina | 100 | 100 |
| Daxad 32 (trademark of W. R. Grace) | 0.25 | 1 |
| Water - to 77.5 percent solids | — | 28.4 |

The master batch was charged to a one gallon milling crock filled to about 50 percent of its volume with 1.2 cm ceramic balls, and milled for 18 hours. The milled master batch was a smooth dispersed slurry and was recovered through a 325 mesh screen. The viscosity was about 70 Cp and the pH was about 9.2.

To 96.8 grams of master batch slurry was added a sufficient amount of the following binders as an emulsion having a 40 percent solids content to give 3 percent binder by dry weight based on the ceramic. The binder emulsions are generally commercially available at more than 40 percent solids but are diluted to 40 percent solids for mixing.

The resulting composition was placed in a jar, which was then placed on its side and agitated vigorously on a table shaker for 1 hour. The slurry was then spread on a Teflon (trademark) sheet and dried overnight at room temperature. The dry material was then granulated to pass through a −30 to +100 Tyler mesh.

The latices used in the experiments were as follows:

TABLE I

| Latex | Type | Tg °C. |
|---|---|---|
| Rhoplex-B-60A | acrylate | −8 |
| POLYSAR Latex AL-608 | acrylate | −9 |
| POLYSAR Latex AL-601 | styrene acrylate | +19 |
| POLYSAR Latex AL-611 | ACN acrylate | +29 |
| POLYSAR Latex AL-703 | PVC homopolymer | +76 |
| POLYSAR Latex AL-707 | PVC/acrylate | −3 |
| POLYSAR Latex 403 | SBR | −55 |
| POLYSAR Latex 746 | carboxylated SBR | +40 |
| POLYSAR Latex 724 | polystyrene | +102 |
| POLYSAR Latex 1138 | carboxylated SBR | −2 |

Rhoplex-B-60A is a trademark of Rohm and Haas Company.
POLYSAR is a trademark of Polysar Limited.

The granules were then subjected to various treatments. The granules were dry pressed to form a pellet at compaction pressures of 5, 10, 15, and 20 k psi. This served as a control. The fracture strength of the pellets was then measured in psi. The procedure used was a diametral compression test essentially as outlined in Determination of Tablet Strength Diametral Compression Test, J. M. Newton, Sci. 59(5) 641 (1970). The control was repeated except that the green part was subject to a heat treatment at a temperature of 150° C. from 2.5 to 10 minutes. The granules were also subject to a similar heat treatment prior to dry pressing. The tensile strength of the pellet from the preheated granules were also tested.

The data for these experiments is given in Tables II through Table XI. In the drawing FIGS. I through X are graphs respectively of the data in Tables II through XI respectively. On the graphs the bars show the percent change and not the value of the fracture strength of the pellet. The preheat treatment of the granules results in a lower fracture strength and also a lower green density. In Tables II–V and XI, the heat treatment was conducted for three periods of time. In Tables VI through X the heat treatment was conducted once for 5 minutes.

TABLE II

RHOPLEX B-60A @ 3.0%

| TIME @ 150° C. MINUTES | COMPACTION PRESSURE KPSI | GREEN FRACTURE STRENGTH PSI | % LOSS/GAIN | CORRECTED GREEN DENSITY % THEORETICAL MAXIMUM |
|---|---|---|---|---|
| \multicolumn{5}{c}{NO HEAT TREATMENT} | | | | |
| 0 | 5 | 72 | 0 | 53.97 |
| 0 | 10 | 94 | 0 | 55.78 |
| 0 | 15 | 109 | 0 | 56.76 |
| 0 | 20 | 123 | 0 | 57.32 |
| \multicolumn{5}{c}{HEATED PELLETS} | | | | |
| 2.5 | 5 | 75 | +5 | 53.70 |
| 2.5 | 10 | 102 | +9 | 55.68 |
| 2.5 | 15 | 113 | +4 | 56.68 |
| 2.5 | 20 | 130 | +6 | 57.29 |
| 5.0 | 5 | 86 | +20 | 53.78 |
| 5.0 | 10 | 110 | +17 | 55.49 |
| 5.0 | 15 | 133 | +22 | 56.67 |
| 5.0 | 20 | 154 | +25 | 57.24 |
| 10.0 | 5 | 86 | +20 | 53.78 |
| 10.0 | 10 | 116 | +24 | 55.61 |
| 10.0 | 15 | 137 | +26 | 56.56 |
| 10.0 | 20 | 152 | +24 | 57.30 |
| \multicolumn{5}{c}{HEATED GRANULES} | | | | |
| 2.5 | 5 | 42 | −41 | 51.97 |
| 2.5 | 10 | 67 | −29 | 54.53 |
| 2.5 | 15 | 84 | −23 | 55.88 |
| 2.5 | 20 | 97 | −21 | 56.60 |
| 5.0 | 5 | 39 | −45 | 51.38 |
| 5.0 | 10 | 66 | −29 | 54.52 |
| 5.0 | 15 | 81 | −26 | 55.65 |
| 5.0 | 20 | 100 | −18 | 56.44 |
| 10.0 | 5 | 36 | −50 | 50.26 |
| 10.0 | 10 | 62 | −34 | 54.39 |
| 10.0 | 15 | 76 | −30 | 55.57 |
| 10.0 | 20 | 88 | −29 | 56.36 |

Note:
Density Corrected for Organic Content, Theoretical Maximum, 3.986 G/CC

TABLE III

POLYSAR LATEX AL-608 @ 3.0%

| TIME @ 150° C. MINUTES | COMPACTION PRESSURE KPSI | GREEN FRACTURE STRENGTH PSI | % LOSS/GAIN | CORRECTED GREEN DENSITY % THEORETICAL MAXIMUM |
|---|---|---|---|---|
| \multicolumn{5}{c}{NO HEAT TREATMENT} | | | | |
| 0 | 5 | 52 | 0 | 53.62 |
| 0 | 10 | 69 | 0 | 55.66 |
| 0 | 15 | 84 | 0 | 56.68 |
| 0 | 20 | 92 | 0 | 57.10 |
| \multicolumn{5}{c}{HEATED PELLETS} | | | | |
| 2.5 | 5 | 50 | −4 | 53.09 |
| 2.5 | 10 | 74 | +7 | 55.68 |
| 2.5 | 15 | 87 | +4 | 56.57 |
| 2.5 | 20 | 95 | +3 | 57.27 |

TABLE III-continued

| | | POLYSAR LATEX AL-608 @ 3.0% | | |
|---|---|---|---|---|
| TIME @ 150° C. MINUTES | COMPACTION PRESSURE KPSI | GREEN FRACTURE STRENGTH | | CORRECTED GREEN DENSITY % THEORETICAL MAXIMUM |
| | | PSI | % LOSS/GAIN | |
| 5.0 | 5 | 59 | +13 | 53.25 |
| 5.0 | 10 | 83 | +20 | 55.44 |
| 5.0 | 15 | 100 | +19 | 56.55 |
| 5.0 | 20 | 111 | +21 | 57.44 |
| 10.0 | 5 | 59 | +14 | 53.26 |
| 10.0 | 10 | 91 | +31 | 55.43 |
| 10.0 | 15 | 98 | +17 | 56.73 |
| 10.0 | 20 | 111 | +20 | 57.29 |
| | | HEATED GRANULES | | |
| 2.5 | 5 | 33 | −36 | 50.49 |
| 2.5 | 10 | 58 | −16 | 54.44 |
| 2.5 | 15 | 71 | −15 | 55.84 |
| 2.5 | 20 | 78 | −15 | 56.65 |
| 5.0 | 5 | 37 | −30 | 51.70 |
| 5.0 | 10 | 59 | −16 | 54.66 |
| 5.0 | 15 | 71 | −15 | 56.10 |
| 5.0 | 20 | 80 | −13 | 56.78 |
| 10.0 | 5 | 37 | −28 | 52.15 |
| 10.0 | 10 | 57 | −18 | 54.81 |
| 10.0 | 15 | 69 | −17 | 56.08 |
| 10.0 | 20 | 80 | −13 | 56.89 |

Note:
Density Corrected for Organic Content, Theoretical Maximum, 3.986 G/CC

TABLE IV

| | | POLYSAR LATEX AL-609 @ 3.0% | | |
|---|---|---|---|---|
| TIME @ 150° C. MINUTES | COMPACTION PRESSURE KPSI | GREEN FRACTURE STRENGTH | | CORRECTED GREEN DENSITY % THEORETICAL MAXIMUM |
| | | PSI | % LOSS/GAIN | |
| | | NO HEAT TREATMENT | | |
| 0 | 5 | 52 | 0 | 50.34 |
| 0 | 10 | 91 | 0 | 53.47 |
| 0 | 15 | 107 | 0 | 54.73 |
| 0 | 20 | 125 | 0 | 56.21 |
| | | HEATED PELLETS | | |
| 2.5 | 5 | 72 | +36 | 50.37 |
| 2.5 | 10 | 97 | +7 | 53.51 |
| 2.5 | 15 | 140 | +31 | 54.98 |
| 2.5 | 20 | 162 | +29 | 55.56 |
| 5.0 | 5 | 71 | +35 | 50.53 |
| 5.0 | 10 | 120 | +32 | 53.63 |
| 5.0 | 15 | 142 | +32 | 54.89 |
| 5.0 | 20 | 166 | +32 | 55.86 |
| 10.0 | 5 | 80 | +53 | 50.46 |
| 10.0 | 10 | 114 | +25 | 53.64 |
| 10.0 | 15 | 138 | +29 | 54.92 |
| 10.0 | 20 | 157 | +25 | 55.79 |
| | | HEATED GRANULES | | |
| 2.5 | 5 | 52 | −0 | 50.14 |
| 2.5 | 10 | 76 | −16 | 52.78 |
| 2.5 | 15 | 100 | −7 | 54.33 |
| 2.5 | 20 | 115 | −8 | 55.26 |
| 5.0 | 5 | 49 | −7 | 49.99 |
| 5.0 | 10 | 82 | −10 | 53.03 |
| 5.0 | 15 | 100 | −6 | 54.47 |
| 5.0 | 20 | 117 | −7 | 55.27 |
| 10.0 | 5 | 46 | −13 | 49.84 |
| 10.0 | 10 | 78 | −15 | 52.83 |
| 10.0 | 15 | 98 | −9 | 54.15 |
| 10.0 | 20 | 118 | −6 | 55.29 |

Note:
Density Corrected for Organic Content, Theoretical Maximum, 3.986 G/CC

TABLE V

| | | POLYSAR LATEX AL-611 @ 3.0% | | |
|---|---|---|---|---|
| TIME @ 150° C. MINUTES | COMPACTION PRESSURE KPSI | GREEN FRACTURE STRENGTH | | CORRECTED GREEN DENSITY % THEORETICAL MAXIMUM |
| | | PSI | % LOSS/GAIN | |
| | | NO HEAT TREATMENT | | |
| 0 | 5 | 43 | 0 | 51.29 |
| 0 | 10 | 81 | 0 | 53.80 |

TABLE V-continued

| | | POLYSAR LATEX AL-611 @ 3.0% | | CORRECTED GREEN DENSITY |
|---|---|---|---|---|
| TIME @ 150° C. MINUTES | COMPACTION PRESSURE KPSI | GREEN FRACTURE STRENGTH | | % THEORETICAL MAXIMUM |
| | | PSI | % LOSS/GAIN | |
| 0 | 15 | 95 | 0 | 55.60 |
| 0 | 20 | 113 | 0 | 56.31 |
| | | HEATED PELLETS | | |
| 2.5 | 5 | 64 | +48 | 51.27 |
| 2.5 | 10 | 123 | +54 | 54.19 |
| 2.5 | 15 | 137 | +45 | 55.37 |
| 2.5 | 20 | 188 | +67 | 56.46 |
| 5.0 | 5 | 69 | +60 | 51.15 |
| 5.0 | 10 | 129 | +60 | 54.08 |
| 5.0 | 15 | 158 | +67 | 55.56 |
| 5.0 | 20 | 178 | +58 | 56.24 |
| 10.0 | 5 | 70 | +62 | 51.24 |
| 10.0 | 10 | 114 | +41 | 54.05 |
| 10.0 | 15 | 150 | +58 | 55.44 |
| 10.0 | 20 | 179 | +59 | 56.27 |
| | | HEATED GRANULES | | |
| 2.5 | 5 | 39 | −10 | 50.34 |
| 2.5 | 10 | 68 | −16 | 53.55 |
| 2.5 | 15 | 90 | −5 | 54.88 |
| 2.5 | 20 | 106 | −6 | 55.85 |
| 5.0 | 5 | 41 | −4 | 50.12 |
| 5.0 | 10 | 67 | −17 | 53.08 |
| 5.0 | 15 | 91 | −5 | 54.18 |
| 5.0 | 20 | 112 | −1 | 55.57 |
| 10.0 | 5 | 33 | −24 | 49.76 |
| 10.0 | 10 | 61 | −25 | 52.86 |
| 10.0 | 15 | 80 | −16 | 54.30 |
| 10.0 | 20 | 100 | −11 | 55.46 |

Note:
Density Corrected for Organic Content, Theoretical Maximum, 3.986 G/CC

TABLE VI

| | | | GREEN FRACTURE STRENGTH - PSI | | | | CORRECT GREEN DENSITY - % THEORETICAL MAXIMUM | | | | |
|---|---|---|---|---|---|---|---|---|---|---|---|
| BINDER 3.0% | COMPACTION KPSI | NO-HEAT PSI | HEATED PELLETS | | HEATED GRANULES | | NO-HEAT % THEO. | HEATED PELLETS | | HEATED GRANULES | |
| | | | PSI | % LOSS/GAIN | PSI | % LOSS/GAIN | | % THEO. | % LOSS/GAIN | % THEO. | % LOSS/GAIN |
| POLYSAR LATEX 7177 | 5 | 38 | 73 | +94 | 31 | −19 | 54.13 | 54.32 | +0.4 | 53.17 | −1. |
| | 10 | 49 | 102 | +108 | 48 | −2 | 55.52 | 55.53 | 0 | 54.76 | −1. |
| | 15 | 60 | 112 | +86 | 61 | +2 | 56.47 | 56.31 | −0.3 | 55.71 | −1. |
| | 20 | 61 | 122 | +106 | 76 | +25 | 56.94 | 56.82 | −0.2 | 56.46 | −0. |

TABLE VII

| | | | GREEN FRACTURE STRENGTH - PSI | | | | CORRECT GREEN DENSITY - % THEORETICAL MAXIMUM | | | | |
|---|---|---|---|---|---|---|---|---|---|---|---|
| BINDER 3.0% | COMPACTION KPSI | NO-HEAT PSI | HEATED PELLETS | | HEATED GRANULES | | NO-HEAT % THEO. | HEATED PELLETS | | HEATED GRANULES | |
| | | | PSI | % LOSS/GAIN | PSI | % LOSS/GAIN | | % THEO. | % LOSS/GAIN | % THEO. | % LOSS/GAIN |
| POLYSAR LATEX 7560 | 5 | 50 | 53 | +6 | 44 | −12 | 53.14 | 52.56 | −1.1 | 52.48 | −1. |
| | 10 | 68 | 75 | +10 | 59 | −13 | 55.10 | 54.40 | −1.3 | 54.13 | −1. |
| | 15 | 84 | 92 | +10 | 76 | −10 | 55.76 | 55.78 | +0.4 | 56.17 | −0. |
| | 20 | 93 | 102 | +10 | 83 | −11 | 56.68 | 56.61 | −0.1 | 56.58 | −0. |

TABLE VIII

| | | | GREEN FRACTURE STRENGTH - PSI | | | | CORRECT GREEN DENSITY - % THEORETICAL MAXIMUM | | | | |
|---|---|---|---|---|---|---|---|---|---|---|---|
| BINDER 3.0% | COMPACTION KPSI | NO-HEAT PSI | HEATED PELLETS | | HEATED GRANULES | | NO-HEAT % THEO. | HEATED PELLETS | | HEATED GRANULES | |
| | | | PSI | % LOSS/GAIN | PSI | % LOSS/GAIN | | % THEO. | % LOSS/GAIN | % THEO. | % LOSS/GAIN |
| POLYSAR LATEX 403 | 5 | 73 | 78 | +7 | 40 | −45 | 55.77 | 55.37 | −0.7 | 53.42 | −4. |
| | 10 | 92 | 96 | +4 | 61 | −34 | 57.15 | 56.78 | −0.5 | 55.50 | −2. |
| | 15 | 98 | 107 | +10 | 71 | −28 | 57.72 | 57.77 | +0.4 | 56.35 | −2. |
| | 20 | 107 | 118 | +10 | 80 | +25 | 58.39 | 57.84 | −0.9 | 57.05 | −2. |

TABLE IX

| BINDER 3.0% | COMPACTION KPSI | GREEN FRACTURE STRENGTH - PSI | | | | | CORRECT GREEN DENSITY - % THEORETICAL MAXIMUM | | | | |
|---|---|---|---|---|---|---|---|---|---|---|---|
| | | NO-HEAT PSI | HEATED PELLETS | | HEATED GRANULES | | NO-HEAT % THEO. | HEATED PELLETS | | HEATED GRANULES | |
| | | | PSI | % LOSS/GAIN | PSI | % LOSS/GAIN | | % THEO. | % LOSS/GAIN | % THEO. | % LOSS/GAIN |
| POLYSAR LATEX 746 | 5 | 88 | 139 | +58 | 79 | −10 | 53.08 | 52.19 | −1.7 | 51.54 | −2. |
| | 10 | 123 | 189 | +54 | 109 | −11 | 55.01 | 54.08 | −1.7 | 53.53 | −2. |
| | 15 | 132 | 226 | +71 | 134 | +4 | 55.41 | 55.29 | −0.2 | 54.90 | −0. |
| | 20 | 147 | 245 | +66 | 153 | +4 | 56.17 | 56.07 | −0.2 | 55.73 | −0. |

TABLE X

| BINDER 3.0% | COMPACTION KPSI | GREEN FRACTURE STRENGTH - PSI | | | | | CORRECT GREEN DENSITY - % THEORETICAL MAXIMUM | | | | |
|---|---|---|---|---|---|---|---|---|---|---|---|
| | | NO-HEAT PSI | HEATED PELLETS | | HEATED GRANULES | | NO-HEAT % THEO. | HEATED PELLETS | | HEATED GRANULES | |
| | | | PSI | % LOSS/GAIN | PSI | % LOSS/GAIN | | % THEO. | % LOSS/GAIN | % THEO. | % LOSS/GAIN |
| POLYSAR LATEX 724 | 5 | 47 | 115 | +144 | 36 | −23 | 53.52 | 52.45 | −2.0 | 50.78 | −5. |
| | 10 | 63 | 163 | +157 | 59 | −7 | 54.71 | 54.79 | +0.1 | 53.69 | −1. |
| | 15 | 75 | 192 | +157 | 83 | +11 | 55.66 | 55.56 | −0.2 | 54.95 | −1. |
| | 20 | 76 | 202 | +167 | 103 | +35 | 56.34 | 56.25 | −0.2 | 55.23 | −2. |

TABLE XI

POLYSAR LATEX 1138 @ 3.0%

| TIME @ 150° C. MINUTES | COMPACTION PRESSURE KPSI | GREEN FRACTURE STRENGTH | | CORRECTED GREEN DENSITY % THEORETICAL MAXIMUM |
|---|---|---|---|---|
| | | PSI | % LOSS/GAIN | |
| NO HEAT TREATMENT | | | | |
| 0 | 5 | 46 | 0 | 51.42 |
| 0 | 10 | 78 | 0 | 54.25 |
| 0 | 15 | 99 | 0 | 55.26 |
| 0 | 20 | 115 | 0 | 56.22 |
| HEATED PELLETS | | | | |
| 2.5 | 5 | 69 | +52 | 51.21 |
| 2.5 | 10 | 103 | +32 | 54.21 |
| 2.5 | 15 | 143 | +44 | 55.33 |
| 2.5 | 20 | 171 | +49 | 56.16 |
| 5.0 | 5 | 71 | +54 | 51.34 |
| 5.0 | 10 | 107 | +36 | 54.24 |
| 5.0 | 15 | 150 | +51 | 55.48 |
| 5.0 | 20 | 168 | +47 | 56.22 |
| 10.0 | 5 | 72 | +58 | 51.38 |
| 10.0 | 10 | 121 | +54 | 54.02 |
| 10.0 | 15 | 154 | +55 | 55.36 |
| 10.0 | 20 | 155 | +35 | 56.08 |
| HEATED GRANULES | | | | |
| 2.5 | 5 | 42 | −8 | 50.47 |
| 2.5 | 10 | 73 | −7 | 53.38 |
| 2.5 | 15 | 102 | +3 | 54.75 |
| 2.5 | 20 | 108 | −6 | 55.49 |
| 5.0 | 5 | 51 | +12 | 50.50 |
| 5.0 | 10 | 81 | +4 | 53.50 |
| 5.0 | 15 | 107 | +8 | 54.86 |
| 5.0 | 20 | 124 | +8 | 55.40 |
| 10.0 | 5 | 48 | +5 | 50.39 |
| 10.0 | 10 | 78 | −1 | 53.15 |
| 10.0 | 15 | 96 | −4 | 54.42 |
| 10.0 | 20 | 106 | −8 | 55.43 |

Note:
Density Corrected for Organic Content, Theoretical Maximum, 3.986 G/CC

EXAMPLE II

A slurry was prepared as described above with POLYSAR latex AL-611 except that the amount of binder was 25 parts by dry weight per 100 parts by weight of Alumina. The ceramic powder was prepared as described above and pellets were compacted at two pressures; 5 and 20 kpsi. The pellets were tested for green fracture strength without a heat treatment and with a 5 min. heat treatment at 150° C. The results are presented in Table XII.

TABLE XII

| COMPACTION PRESSURE (KPSI) | HEATED | CORRECTED DENSITY (% THEO.) | FRACTURE STRENGTH (PSI) | INCREASE (%) |
|---|---|---|---|---|
| 5 | NO | 34.56 | 37.7 | |
| 5 | YES | 33.10 | 65.3 | 58 |
| 20 | NO | 40.79 | 183.5 | |
| 20 | YES | 39.73 | 312.5 | 58 |

Note
The green densities are low because they have been corrected for organic content.

EXAMPLE III

A master batch of ceramic slurry comprising by dry weight 50 parts of ceramic material, 2 parts of Polysar Latex AL-608, 2 parts of Santicizer 160 (trademark of Monsanto Co. for butyl benzyl phthalate) was prepared as described above. The ceramic was cast on a polypropylene film at 0.007 inches wet thickness. They were dried at room temperature for 18 hours. One sample of tape was not subject to further treatment. One sample of tape was subject to further heat treatment at about 150° C. (300° F.) for 2.5 min and 5 min. Triplicate dumbbells were then cut from the film and the tensile strength of the dumbbell was determined on an Instron (using a pull test rather than the crush test referred to above). The results are as follows:

| | Tensile Strength | |
|---|---|---|
| No Heat | 13.51 | kg/cm² |
| 2.5 min 150° C. | 14.44 | |
| 5 min 150° C. | 21.90 | |

The actual density (not corrected for binder) was 2.23 gm/cm³.

EXAMPLE IV

A master batch slurry was prepared as in Example III. The film was cast as described in Example III. The film was then cut into several strips. The control was not subject to any further treatment. The samples of the material were then subject to UV treatments for various lengths of time at 30 minutes, 1 hour, 4 hours, and 24 hours. The temperature in the UV device was 140° F. The UV source was provided by three General Electric sun lamps of 275 watts each.

The distance from the UV source was about 10 inches.

Dumbbell samples were punched from the tape and the tensile strength of the ceramic (using a pull test rather than a crush test) were determined on an Instron. The results are reported in Table XIII.

TABLE XIII

| Material | Tensile kg/cm² (average of 3 tests) | Percent change |
|---|---|---|
| Control | 13.6 | |
| 30 min. | 14.4 | 8.8% |
| 1 hour | 13.9 | .2% |
| 4 hours | 13.6 | 0% |
| 24 hours | 14.2 | 4% |

There is a decline in properties after the initial strength improvement. It is not clear why this occurs. It is speculated that the polymer may be degrading. Per se this is not undesirable as ultimately the polymer must be burned out. This demonstrates the need to control the energy input into the ceramic. With energy inputs which operate in a very narrow range with relative intensity it is important to select an energy input with the best efficiency (i.e. select the appropriate wave length for UV etc.)

EXAMPLE V

Four slurries were prepared as described above. The composition of the slurry in parts by dry weight was:

| | | |
|---|---|---|
| Alumina | 100 | 100 |
| Binder | 3 | 3 |
| Ethylene diamine carbamate | .06 | Nil |

The binders were POLYSAR Latex AL-611 and 1138. The slurry was dried and hand granulated to pass through −30 to +100 Tyler mesh and pellets were prepared under a compaction pressure of 10,000 psi. One set of pellets was subjected to heat treatment for 15 minutes at 150° C. The pellets were then subject to a crush test to determine the green fracture strength of the pellets in psi. The results are reported in Table XIV.

TABLE XIV

| Binder | AL-611 | AL-611 | AL-611 | 1138 | 1138 | 1138 |
|---|---|---|---|---|---|---|
| Ethylene diamine carbamate | No | Yes | Yes | No | No | Yes |
| Heat Treatment | No | No | Yes | No | Yes | Yes |
| Green Fracture Strength (psi) | 62.3 | 102.0 | 118.3 | 98.4 | 118.6 | 132.8 |

What is claimed is:

1. A process for increasing the green fracture strength of a ceramic part comprising:
   (i) forming an aqueous based ceramic composition having at least 50 weight percent of solids comprising at least 65 weight percent of a mixture of from 100 to 85 weight percent of ceramic particles, and 0 to 15 weight percent of a flux material; a sufficient amount of an aqueous emulsion of a polymeric binder which has a Tg from about −100° to about 120° C. to provide from 0.5 to 35 weight percent of said binder and optionally up to 5 weight percent of a dispersing agent,
   (ii) spray drying said aqueous based ceramic composition to produce a free flowing particulate ceramic material and forming said green part by subjecting said particulate ceramic to a compaction step a pressure of from 2500 to 30,000 psi to a density of at least 50 percent theoretical density; and
   (iii) subjecting said green part to one or more energy treatments selected from the group consisting of election beam irradiation, x-ray irradiation, a heat treatment from about 50° to 200° C., or a combination of heat and pressure treatment, for a period of time sufficient to increase the green fracture strength of said green ceramic part.

2. A process according to claim 1 wherein said binder is a polymer selected from the group consisting of:
(i) polymers comprising at least about 60 weight percent of one or more $C_{1-6}$ alkyl or hydroxy alkyl esters of a $C_{3-6}$ ethylenically unsaturated monocarboxylic acid or a half esters of a $C_{3-6}$ ethylenically unsaturated dicarboxylic acid; up to 40 weight percent of one or more monomers selected from the group consisting of $C_{8-12}$ vinyl aromatic monomers which may be unsubstituted or substituted by a $C_{1-4}$ alkyl radical and $C_{3-6}$ alkenyl nitriles; and $C_{3-8}$ alkenyl or hydroxy alkenyl esters of a $C_{1-8}$ saturated carboxylic acid and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals;

(ii) polymers comprising: from about 20 to about 60 weight percent of a $C_{8-12}$ vinyl aromatic monomer which may be unsubstituted or substituted by a $C_{1-4}$ alkyl or hydroxy alkyl radical from about 80 to about 40 weight percent of one or more $C_{4-6}$ conjugated diolefins which may be unsubstituted or substituted by a chlorine atom; and optionally up to a total of 10 weight percent of one or more monomers selected from the group consisting of $C_{3-6}$ ethylenically unsaturated carboxylic acids; $C_{3-6}$ ethylenically unsaturated aldehydes; $C_{8-4}$ alkyl and hydroxy alkyl esters of $C_{3-6}$ ethylenically unsaturated carboxylic acids and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals, (iii) polymers comprising:
(i) from about 1 to 25 weight percent of one more $C_{2-3}$ alpha olefins; from about 65 to 99 weight percent of one or more monomers selected from the group consisting of a $C_{3-6}$ ethylenically unsaturated ester of a $C_{1-6}$ non addition polymerizable carboxylic acid, vinyl chloride, and vinylidene chloride; and optionally up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxy alkyl esters of $C_{3-6}$ ethylenically unsaturated carboxylic acids and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals, (iv) polymers comprising homopolymers of vinyl chloride and vinylidene chloride;

(v) polymers comprising: from about 15 to 50 weight percent of a $C_{3-6}$ alkenyl nitrile; from 75 to 50 weight percent of one or more monomers selected from the group consisting of:
$C_{8-12}$ vinyl aromatic monomers which may unsubstituted or substituted by a
$C_{1-4}$ alkyl radical;
$C_{4-6}$ conjugated diolefins; and
$C_{1-4}$ alkyl or hydroxy alkyl esters of
$C_{3-6}$ ethylenically unsaturated carboxylic acids; and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxyalkyl radicals, (vi) polymers of one or more monomers selected from the group consisting of $C_{4-6}$ conjugated diolefins; and (vii) copolymers of from 75 to 25 weight percent vinyl chloride or vinylidene chloride and one or more monomers selected from the group consisting of:
from 25 to 75 weight percent of $C_{3-6}$ alkyl or hydroxyalkyl esters of $C_{3-6}$ ethylenically unsaturated carboxylic acids; and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxyalkyl radicals, (viii) a polymer comprising at least about 80 percent of a $C_{8-12}$ vinyl aromatic monomer which may be unsubstituted or substituted by a $C_{1-4}$ alkyl radical; and optionally up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl or hydroxy alkyl esters of $C_{3-6}$ ethylenically unsaturated carboxylic acids; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxyalkyl radicals.

3. A process according to claim 2 wherein said ceramic material has a particle size from 0.5 to 12 microns and is selected from the group consisting of alumina, silicon carbide, silicon nitride, zirconia, silica, barium titanate and mixtures thereof.

4. A process according to claim 3 wherein said latex has a bimodal particle size distribution so that from about 65 to 85 weight percent of the particles have a size from about 1700 to 3000 Å and about 35 to 15 weight percent of the particles have a size from 300 to 1000 Å.

5. A process according to claim 3 wherein said binder is present in an amount from about 0.5 to 6 weight percent based on the dry weight of the ceramic material and is a polymer having a Tg from $-20°$ to about $+35°$ C. comprising at least 90 percent of one or more monomers selected from the group.

$C_{1-6}$ alkyl or hydroxyalkyl esters of acrylic or methacrylic acid; and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxyalkyl radicals.

6. A process according to claim 3 wherein said binder is present in an amount from about 0.5 to 6 weight percent based on the dry weight of the ceramic material and is a styrene-acrylate polymer comprising:

from about 50 to 95 weight percent of one or more $C_{3-5}$ alkyl or hydroxy alkyl ester of acrylic or methacrylic acid;

from about 5 to 40 weight percent of one or more monomers selected from the group consisting of $C_{8-12}$ vinyl aromatic monomers which may be unsubstituted or substituted by a $C_{1-4}$ alkyl radical; and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxyalkyl radicals.

7. A process according to claim 3 wherein said binder is present in an amount from about 0.5 to 6 weight percent based on the dry weight of the ceramic material and is a polymer comprising:

(i) from about 1 to 25 weight percent of one or more $C_{2-3}$ alpha olefins; from about 65 to 99 weight percent of a $C_{3-6}$ ethylenically unsaturated ester of a $C_{1-6}$ non addition polymerizable carboxylic acid, and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides may be unsubstituted or substituted at the nitrogen atom by up to two radicals selected from the group consisting of $C_{1-4}$ alkyl radicals and $C_{1-4}$ hydroxy alkyl radicals.

8. A process according to claim 5 wherein said dispersing agent is present in an amount of less than about 2 weight percent based on the ceramic composition and is a carboxylated polyelectrolyte.

9. A process according to claim 8 wherein said compaction is carried out by a process selected from the group consisting of dry pressing, roll compaction and hot isostatic pressing.

10. A process according to claim 9 wherein said compaction and said heat treatment are carried out concurrently.

11. A process according to claim 6 wherein said dispersing agent is present in an amount of less than about 2 weight percent based on the ceramic composition and is a carboxylated polyelectrolyte.

12. A process according to claim 11 wherein said compaction is carried out by a process selected from the group consisting of dry pressing, roll compaction and hot isostatic pressing.

13. A process according to claim 12 wherein said compaction and said heat treatment are carried out concurrently.

14. A process according to claim 7 wherein said dispersing agent is present in an amount of less than about 2 weight percent based on the ceramic composition and is a carboxylated polyelectrolyte.

15. A process according to claim 14 wherein said compaction is carried out by a process selected from the group consisting of dry pressing, roll compaction and hot isostatic pressing.

16. A process according to claim 15 wherein said compaction and said heat treatment are carried out concurrently.

* * * * *